United States Patent Office 2,717,892
Patented Sept. 13, 1955

2,717,892

PURIFICATION OF STREPTOMYCIN

Oliver B. Fardig, Liverpool, and Irving R. Hooper, De Witt, N. Y., assignors to Bristol Laboratories Inc., Syracuse, N. Y., a corporation of New York No Drawing. Application May 10, 1952, Serial No. 287,252

6 Claims. (Cl. 260—210)

This invention relates to an improved process for the purification of the antibiotic streptomycin and more particularly to an improved process for the removal of mannosidostreptomycin from streptomycin.

It is well known that streptomycin is a therapeutically useful, basic organic compound elaborated by strains of the micro-organism Streptomyces griseus in suitable culture media. Streptomycin, chemically designated N-methyl-L-glucosaminido-streptosido-streptidine, is obtained from the elaboration products of Streptomyces griseus and purified by adsorption on charcoal, alumina or cation exchange resins followed by elution with an acidic solvent such as acidified water or methanol.

Streptomycin prepared by these procedures contains as a more toxic and less active impurity a substance identified by Stavely and Fried [J. Amer. Chem. Soc. 71, 135–139 (Jan. 1949)] as a D-mannosido-N-methyl-$\alpha$-L-glucosaminido-L-streptoside of streptidine and generally called mannosido-streptomycin [Science 107, 233–4 (March 5, 1948)]. Removal of the mannosido-streptomycin is essential to the preparation of pure, highly potent streptomycin of low toxicity. This removal has previously been possible only by the very inefficient and expensive process of chromatography on alumina (U. S. Patent No. 2,565,653), which is unsuitable for commercial production, or by the elaborate, expensive and time-consuming process of formation and recrystallization of certain complex salts of streptomycin [U. S. Patent 2,472,453; see Peck et al., J. Amer. Chem. Soc., 67, 1866 (October 1945)], or by other techniques not suitable for commercial production.

It is an object of this invention to provide a novel, effective and useful process for the removal of mannosidostreptomycin from streptomycin.

There is now discovered according to the present invention the process of removing, from a mixture of mannosidostreptomycin and streptomycin adsorbed on a cation exchange resin, an eluate containing a greater proportion of mannosidostreptomycin than the original mixture, which comprises bringing a solution of boric acid into contact with the resin and then separating the liquid from the solid resin.

There is further discovered according to the present invention the process of removing from a mixture of mannosidostreptomycin and streptomycin adsorbed on a cation exchange resin deriving its exchange capacity essentially from carboxylic groups, an eluate containing a greater proportion of mannosidostreptomycin than the original mixture, which comprises bringing a solution of boric acid into contact with the resin and then separating the liquid from the solid resin.

There is further discovered according to the present invention the process of removing from a mixture of mannosidostreptomycin and streptomycin adsorbed on a cation exchange resin deriving its exchange capacity essentially from carboxylic groups and formed by the copolymerization of a divinylbenzene and a polymerizable carboxylic acid, an eluate containing a greater proportion of mannosidostreptomycin than the original mixture, which comprises bringing a solution of boric acid into contact with the resin and then separating the liquid from the solid resin.

There is further discovered according to the present invention the process of removing from a mixture of mannosidostreptomycin and streptomycin adsorbed on a cation exchange resin formed by condensing a phenol and an aldehyde, one of which contains a carboxylic group, an eluate containing a greater proportion of mannosidostreptomycin than the original mixture, which comprises bringing a solution of boric acid into contact with the resin and then separating the liquid from the solid resin.

A more comprehensive understanding of this invention is obtained by reference to the following examples.

EXAMPLE I

Crude streptomycin hydrochloride, assaying 525 units/mgm. and containing 4.0% mannosidostreptomycin, prepared according to the prior art and dissolved in water in a concentration of 4.3 grams/liter was passed through approximately 13 ml. by volume of a column of cation exchange resin IRC-50 in the sodium form until near saturation of the resin was obtained. The column was rinsed with distilled water and then washed at a rate of about 5 ml. of boric acid solution per minute per 10 ml. of resin with three portions of a 2.5% (w./v.) solution of boric acid having a pH of about 4.4–4.5. By weight/volume, abbreviated w./v., is meant parts by weight of boric acid in grams per parts by volume of solvent water in milliliters; thus, in this case 15 grams of boric acid were dissolved in 600 ml. of water. The three boric acid washes were of 200 ml. each.

Each of these washes was collected separately, numbered first, second and third, respectively, and assayed for mannosidostreptomycin after recovery of the solids dissolved in the wash liquor. These solids were recovered by passing the wash liquor through separate columns of IRC-50 in sodium form until all material of antibiotic activity was adsorbed, eluting all of this activity with one normal sulfuric acid (100 ml.), neutralizing these eluates by passage over anion exchange resin 1R-4B and lyophilizing the neutral eluate to obtain the solids (A, B and C) having antibiotic activity.

The original column, after the three boric acid washes, was backwashed with water and eluted at a rate of 2 ml./min. with one portion of 50 ml. of one normal sulfuric acid. The eluate was neutralized by passage over an ion exchange resin 1R-4B and lyophilized to give a solid product (D) of streptomycin sulfate having a higher potency and containing a lesser percentage of mannosidostreptomycin than did the starting material. The results of the assays are given in Table I, below. "Total Maltol" (u./mg.) refers to the total content in units per milligram of streptomycin and mannosidostreptomycin as determined by reaction with hot, dilute alkali to form maltol.

Table I

| Source of Sample | Weight in mgms. | Total Maltol (u./mg.) | Percent Content (in terms of units) of Mannosido-streptomycin |
|---|---|---|---|
| Starting material | | 525 | 4.0 |
| First Wash (A) | 460 | 43 | 61.9 |
| Second Wash (B) | 480 | 60 | 56.3 |
| Third Wash (C) | 690 | 57 | 18.2 |
| Purified Product (D) | 2,680 | 687 | 1.9 |

Assayed at 1 mgm./ml.

It is apparent from Table I that the procedure of this invention has increased the potency of the final product, streptomycin, and has removed in relatively concentrated form large amounts of the less potent and more toxic impurity, mannosidostreptomycin.

EXAMPLE II

Crude streptomycin, assaying 625 units/mgm. and containing 3.3% mannosidostreptomycin, was prepared according to the prior art, dissolved in water and passed through a column of cation exchange resin IRC–50 in the sodium form until near saturation of the resin was obtained. The resin was removed from the column, dried, well mixed, and divided into two equal parts. Each part was placed in an identical column (A, B) and backwashed with water. One of the columns (A) was washed with three 100 ml. portions of 2.5% (w./v.) boric acid of pH 4.5 at a rate of 5 ml./minute/5 ml. resin. Each of these washes was collected separately, numbered first, second and third respectively, and adsorbed onto a column of IRC–50 (L, M, and N respectively). The antibiotic activity was eluted with one normal sulfuric acid (50 ml.). The eluates were neutralized by passage over anion exchange resin 1R–4B and lyophilized to obtain the solids (L, M, N) having antibiotic activity.

Columns A and B were then backwashed with water and eluted with a portion of about 22 ml. of one normal sulfuric acid. These eluates were neutralized by passage over anion exchange resin 1R–4B and lyophilized to give solids A and B respectively. The results of assay of these solids are given below in Table II.

Table II

| Source of Sample | Solid | Weight in mgms. | Total Maltol (u./mgm.) | Percent Content of Mannosidostreptomycin |
|---|---|---|---|---|
| Starting material | | | 625 | 3.3 |
| Column A—First wash | L | 490 | 25 | 100 |
| Column A—Second wash | M | 650 | 11 | 100 |
| Column A—Third wash | N | 400 | 11 | 100 |
| Column A—Final Eluate | A | 1,250 | 785 | 1.9 |
| Column B eluate | B | 1,310 | 680 | 3.2 |

It is apparent from Table I that the procedure of this invention has increased the potency of the final product, streptomycin, and has removed in relatively concentrated form large amounts of the less potent and more toxic impurity, mannosidostreptomycin.

In place of the preferred Amberlite IRC–50 (a cation exchanger in which the activity is due to the carboxylic group exclusively), we may use other cation exchange resin, such as Amberlite IRC–100 (a modified phenol-formaldehyde sulfonic acid type resin), also sold by the Resinous Products Company. Some of the resins we may employ are disclosed in U. S. Patent 2,104,501 and are defined as synthetic resins obtained by the condensation of a mixture comprising a polyhydric phenolic body and a methylene body. Suitable carboxylic cation exchange resins which are commercially available include Alkalex (a carboxylic type exchanger from alkaline oxidation of coal) (Research Products), Amberlite IRC–50 (Rohm and Haas), Duolite CS–100 (phenol-aldehyde carboxylic acid type resin) (Chemical Process), and Wofatit C (a resorcylic acid-formaldehyde condensate) (I. G. Farben).

Typical carboxylated cation-exchange materials useful in the application of this invention include the following:

(a) The partial esters produced by the reaction of polybasic carboxylic acids or acid anhydrides with polysaccharides or other polymeric substances containing esterifiable hydroxyl groups. For information on these resins, reference is made to the work of McIntire and Schenck [J. Am. Chem. Soc. 70, 1193 (1948)].

(b) Phenol-formaldehyde resins containing co-condensed amino-carboxylic acids, especially as described in U. S. Patents 2,373,547 and 2,373,548.

(c) Resins produced by condensation of an aldehyde with a carboxylated monohydric or polyhydric phenol, such as Wofatit C, which is produced in Germany by the reaction of formaldehyde with 3,5-dihydroxybenzoic acid as described in Fiat Final Report No. 715, Feb. 4, 1946.

(d) Resins prepared by treatment of a phenol-aldehyde resin gel with carbon dioxide, or substances such as bicarbonate that liberate carbon dioxide, as described in Belgian Patent 447,662, Nov. 30, 1942.

(e) Insoluble copolymers produced from polymerizable mixtures containing maleic anhydride, such as those described in U. S. Patent 2,340,110.

(f) Insoluble copolymers produced from polymerizable mixtures containing acrylic or methacrylic acid, such as those prepared by the methods described in U. S. Patent 2,340,111.

Thus, ion exchange resins having carboxylic polar groups have heretofore been described in the literature. In general, they are formed either by condensing a phenol and an aldehyde, one of which contains a carboxyl group, particularly resorcylic acid and formaldehyde, or by the copolymerization of a polymerizable acid with a divinyl compound, i. e., a compound having two $CH_2=CH-$ groups, such as acrylic or methacrylic acid and divinyl benzene. Resins of this type are described in U. S. Patents 2,309,359; 2,333,754; 2,340,110; 2,340,111 and others and are characterized by the common quality of having their ion-exchange ability dependent upon carboxyl groups in the resin molecule. One of the preferred embodiments of the present invention includes the use of a copolymer of acrylic or methacrylic acid and divinylbenzene as such resins possess a great number of carboxyl groups per unit of weight and as a result thereof a high capacity for adsorbing ions. It is known, however, that the capacity of ion-exchange resins to absorb streptomycin is not dependent alone upon the number of polar groups in a given weight or volume of resin. It is also dependent on the porosity of the resin for in a dense resin only the polar groups on the outer surface of the resin particle are able to react with the antibiotic whereas in the case of a resin of porous structure the streptomycin molecules will at least partially penetrate the pores of the resin and react with polar groups in the interior of the resin particle.

In the case of phenol-formaldehyde resin condensates a porous resin structure is obtained by having the condensation reaction pass through an aqueous gel stage in the manner well-known to the art. In copolymers of polymerizable acids and divinyl compounds the porosity is to a large extent dependent upon the degree of cross-linking imparted by the divinyl component. In these copolymers the divinyl component is thought to contribute water-insolubility and a certain degree of hardness to the resin but at the same time to detract from the porosity of the resin. It is, therefore, desirable in practicing the present invention with this type of ion-exchange resin to use a resin containing the least amount of divinyl compound that will produce the physical properties required of the ion-exchange material.

Among the ion-exchange resins which we have found to be most efficient in the practice of our process are copolymers of acrylic or methacrylic acid and divinylbenzene wherein the divinylbenzene component constitutes from 2½ to 5 percent of the resin composition. Such resins have an extremely high capacity for streptomycin and in some instances will absorb their own weight of streptomycin from broth. Their capacity in some cases is in excess of thirty times the capacity of an equal weight of the carbon adsorbents. Larger amounts of divinylbenzene may be used in making the resin but with sacrifice of capacity, and no advantage is to be gained by going beyond a 10% divinylbenzene content.

For the adsorption of streptomycin we prefer to have the resin in the form of its sodium salt, for the sodium salt is economical to use, is readily replaced by streptomycin and is non-toxic. Other monovalent metals are the substantial equivalent of sodium in operation but are not so economical to use. The ammonium salt is useful. The resin may also be used in the hydrogen form or in a mixed form in which some of the carboxyl groups are in a salt form and some are in the hydrogen form.

Similar use may be made of a carboxylic resin believed to be of the phenol-formaldehyde type known as Permutit XH1C.

The anion exchange resins useful in the examples above include those such as Amberlite IR-4B (see U. S. Patent 2,151,883; an anion exchange resin which is a modified phenol formaldehyde polyamine condensate) sold by the Resinous Products and Chemical Co. of Philadelphia; De-Acidite (an aliphatic amine type resin) (The Permutit Co., New York city); Ionac-A-300 (an amine type resin) (American Cyanamide and Chemical Corp., New York city).

As an anion exchange material we prefer to employ a resin of the type described in U. S. Patent 2,151,883, March 28, 1939. These resins may be described generically as insoluble resin-like products obtained by the reaction of formaldehyde with an aromatic amine. As examples of aromatic amines, there may be mentioned in particular aniline and meta substituted aromatic amines, for example, m-toluidine, m-ethylaminobenzene, sym-m-xylidine and m-phenylenediamine, and the like. Generally, the meta substituted aromatic amines, including m-phenylenediamine, yield products in the nature of resins which are insoluble in dilute acids, while the corresponding ortho-substituted bodies, or certain of them, yield products which are relatively soluble in mineral acids, and the same applies to certain of the products obtained by the condensation of aniline with formaldehyde.

The boric acid of the present invention may be used in various concentrations up to that of a saturated solution, with the preference being given to more concentrated solutions. It is apparent that a reduction by half in the concentration of the boric acid will roughly double the volume required to achieve similar results, other factors being equal. It is apparent that for a column of given size containing streptomycin or resin, the first volumes of boric acid used as a wash are the most efficient in removing mannosidostreptomycin and that subsequent volumes show gradually diminishing returns. The choice of a suitable volume of boric acid solution may thus be made in each individual case by balancing the total cost of the use of additional volumes of boric acid against the need for removing additional amounts of mannosido-streptomycin. The boric acid may be dissolved in methanol, ethanol, or other lower aliphatic alcohols or in mixtures thereof with water.

The process of the present invention is useful for the purification of streptomycin by the removal of mannosidostreptomycin when the latter occurs in any concentration below about fifty percent by weight of the mixture with streptomycin. The process of the present invention is effective on streptomycin mixtures of all degrees of purity; thus this process is effective when fermentation broth is directly adsorbed on the cation exchange resin and also for purified mixtures of streptomycin and mannosidostreptomycin.

As will be obvious to those skilled in the art, the treatment with boric acid of a resin carrying adsorbed streptomycin may be carried out as a batch process in a tank instead of being carried out as a continuous process in a column. The column process is more efficient, however.

The final elution of the purified streptomycin from the resin is easily done by the methods of the prior art, such as the use of aqueous solutions of calcium chloride or of a strong, inorganic, non-oxidizing acid, e. g. hydrochloric acid.

The assays for both the content of mannosidostreptomycin (anthrone method) and the total content of a streptomycin and mannosidostreptomycin (maltol method) were carried out according to the directions of St. John [Anal. Chem., 23, 1289-1291 (1951)].

We claim:

1. The process of removing from a mixture of mannosidostreptomycin and streytomycin adsorbed on a cation exchange resin, an eluate containing a greater proportion of mannosidostreptomycin than the original mixture, which comprises bringing a solution of boric acid into contact with the resin and then separating the liquid from the solid resin.

2. The process of removing from a mixture of mannosidostreptomycin and streptomycin adsorbed on a cation exchange resin deriving its exchange capacity essentially from carboxylic groups, an eluate containing a greater proportion of mannosidostreptomycin than the original mixture, which comprises bringing a solution of boric acid into contact with the resin and then separating the liquid from the solid resin.

3. The process of removing from a mixture of mannosidostreptomycin and streptomycin adsorbed on a cation exchange resin deriving its exchange capacity essentially from carboxylic groups and formed by the copolymerization of a divinylbenzene and a polymerizable carboxylic acid, an eluate containing a greater proportion of mannosidostreptomycin than the original mixture, which comprises bringing a solution of boric acid into contact with the resin and then separating the liquid from the solid resin.

4. The process of removing from a mixture of mannosidostreptomycin and streptomycin adsorbed on a cation exchange resin deriving its exchange capacity essentially from carboxylic groups and formed by the copolymerization of a divinylbenzene and an acid selected from the group consisting of acrylic and methacrylic acids, an eluate containing a greater proportion of mannosidostreptomycin than the original mixture, which comprises bringing a solution of boric acid into contact with the resin and then separating the liquid from the solid resin.

5. The process of removing from a mixture of mannosidostreptomycin and streptomycin adsorbed on a cation exchange resin formed by condensing a phenol and an aldehyde, one of which contains a carboxylic group, an eluate containing a greater proportion of mannosidostreptomycin than the original mixture, which comprises bringing a solution of boric acid into contact with the resin and then separating the liquid from the solid resin.

6. The process of removing from a mixture of mannosidostreptomycin and streptomycin adsorbed on a cation exchange resin formed by condensing resorcylic acid and formaldehyde, an eluate containing a greater proportion of mannosidostreptomycin than the original mixture, which comprises bringing a solution of boric acid into contact with the resin and then separating the liquid from the solid resin.

References Cited in the file of this patent

UNITED STATES PATENTS

| 2,528,022 | Van Dolah et al. | Oct. 31, 1950 |
| 2,541,420 | Howe et al. | Feb. 13, 1951 |
| 2,550,939 | Richardson et al. | May 1, 1951 |